(12) United States Patent
Ogose (10) Patent No.: US 10,913,349 B2
(45) Date of Patent: Feb. 9, 2021

(54) FUEL FILLER PORT DEVICE (71) Applicant: NIFCO INC., Yokosuka (JP)

(72) Inventor: Kensuke Ogose, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/017,289

(22) Filed: Jun. 25, 2018

(65) Prior Publication Data

US 2018/0370353 A1 Dec. 27, 2018

(30) Foreign Application Priority Data

Jun. 27, 2017 (JP) ................................ 2017-125226

(51) Int. Cl.
*B60K 15/04* (2006.01)
(52) U.S. Cl.
CPC ...... *B60K 15/04* (2013.01); *B60K 2015/0429* (2013.01); *B60K 2015/0445* (2013.01); *B60K 2015/0461* (2013.01)
(58) Field of Classification Search
CPC combination set(s) only.
See application file for complete search history.

(56) References Cited

U.S. PATENT DOCUMENTS

| 9,434,248 B2 | 9/2016 | Hagano et al. | |
| 2008/0067797 A1* | 3/2008 | Stephan | B60K 15/04 280/830 |
| 2009/0266835 A1 | 10/2009 | Zentner | |
| 2015/0291022 A1* | 10/2015 | Kobayashi | B60K 15/05 220/86.2 |
| 2018/0170174 A1* | 6/2018 | Wakao | B60K 15/04 |

FOREIGN PATENT DOCUMENTS

| JP | S64-48499 U | 3/1989 |
| JP | 2013-001294 A | 1/2013 |
| JP | 5907028 B2 | 4/2016 |

OTHER PUBLICATIONS

Madsen, "Print Reading for Engineering and Manufacturing Technology", p. 235 (Year: 2012).*
Japan Patent Office, "Offie Action for Japanese Patent Application No. 2017-125226," dated Sep. 15, 2020.

* cited by examiner

*Primary Examiner* — Jessica Cahill
*Assistant Examiner* — Christopher M Afful
(74) *Attorney, Agent, or Firm* — Manabu Kanesaka (57) ABSTRACT

A fuel filler port device includes a fuel filler port, a main flap which is disposed in the fuel filler port and is configured to be rotated to an open position by introducing a fuel filler nozzle to open the fuel filler port, a drain opening disposed in the fuel filler port at an outer side of the main flap, and a closure mechanism which closes the drain opening in a fuel filling state.

6 Claims, 9 Drawing Sheets

FUEL FILLER PORT DEVICE

TECHNICAL FIELD

The invention relates to an improvement of a fuel filler port device which allows introduction of a fuel filler nozzle by opening a fuel filler port through the introduction of the fuel filler nozzle and can achieve fuel filling.

BACKGROUND ART

As a device which is provided in an upper end of a filler pipe (which may be also called as an inlet pipe), and can achieve fuel filling by being opened with an insertion of a fuel filler nozzle in a fuel filler gun, there is a structure shown in Japanese Patent No. 5907028.

The structure in the Japanese Patent has an insertion side opening and closing mechanism which is pushed open by the fuel filler nozzle, and an injection port opening and closing mechanism which is positioned at the back thereof, thereby making a threaded type fuel filler port cap unnecessary. A drainage passage is provided between the insertion side opening and closing mechanism and the injection port opening and closing mechanism, and the fuel remaining between the insertion side opening and closing mechanism and the injection port opening and closing mechanism is adapted to flow out through the drainage passage.

In the meantime, a fuel filler gun is of a type which is additionally provided with a fuel evaporative gas recovery mechanism. The fuel evaporative gas recovery mechanism is a mechanism which sucks the fuel evaporative gas within the fuel filler port at the fuel filling time so as to make the fuel evaporative gas leak to an external portion as little as possible. However, in the case that the drainage passage (the drain opening) as mentioned above is provided within the fuel filler port, the fuel evaporative gas recovery mechanism sucks the outside air therethrough. As a result, there may be generated a situation that the control system side erroneously recognizes the fuel filler gun is not introduced appropriately to the fuel filler port device and stops filling the fuel.

OBJECT OF THE INVENTION

An object of the invention is to provide a fuel filler port device which is provided with a function of flowing a drain staying in a near side of a main flap in the fuel filler port device from the fuel filler port device, and preventing a false recognition in a control system of a fuel filler gun provided with a fuel evaporative gas recovery mechanism.

SUMMARY OF THE INVENTION

In order to achieve the object mentioned above, according to the invention, a fuel filler port device includes a drain opening disposed in a near side of a main flap which is rotated to an open position by introducing a fuel filler nozzle and opens a fuel filler port, wherein the fuel filler port device includes a closure mechanism which closes the drain opening in the fuel filling state.

According to one of aspects of the invention, the closure mechanism is a movable valve element which comes into contact with a part of the introduced fuel filler nozzle, and moves against biasing to a closure position closing the drain opening.

Further, according to one of the aspects of the invention, the closure mechanism is constructed by a movable body which comes into contact with a part of the introduced fuel filler nozzle and is moved against biasing from a reference position, and a movable valve element which is pressed to the moved movable body and moves against biasing to the closure position closing the drain opening.

Further, according to one of the aspects of the invention, the closure mechanism is a movable valve element which comes into contact with a part of the introduced fuel filler nozzle, slides against biasing in a direction of introducing the fuel filler nozzle, and moves to a closure position of closing the drain opening.

Further, according to one of the aspects of the invention, the closure mechanism is constructed by a constant force spring which comes into contact with a part of the introduced fuel filler nozzle and is drawn out against biasing in the direction of introducing the fuel filler nozzle, and a sealing body which is provided in the constant force spring and closes the drain opening at the predetermined pull-out position.

Further, according to one of the aspects of the invention, the closure mechanism is a movable valve element which is biased to a closure position of closing the drain opening, and moves against biasing due to a weight of a drain subject caused by the staying of the drain subject to a near side of the main flap so as to open the drain opening.

Further, according to one of the aspects of the invention, a sub flap is provided in a near side of the main flap, the sub flap being rotated to an open position by introduction of the fuel filler nozzle, and the drain opening is provided in a side portion which is positioned between the main flap and the sub flap.

According to the invention, while including the function of allowing the drain subject staying in the near side of the main flap within the fuel filler port device to flow out of the fuel filler port device or spilling out the drain subject, it is possible to prevent false recognition in the control system of the fuel filler gun provided with the fuel evaporative gas recovery mechanism.

DETAILED DESCRIPTION OF THE INVENTION

A description will be given below for typical embodiments of the invention with reference to FIGS. 1 to 9. A fuel filler port device according to the embodiment is adapted to be attached to a filler pipe (an illustration thereof will be omitted) and construct a fuel filler port 1, and is adapted to open the fuel filler port 1 through introduction of a fuel filler nozzle N so as to allow the introduction, and automatically close the fuel filler port 1 when the introduced fuel filler nozzle N is extracted.

More specifically, the fuel filler port device is adapted to allow introduction of a fuel filler nozzle N by rotating a sub flap 2b and a main flap 5a mentioned later to an open position so as to enable fuel filling when the fuel filler nozzle N (refer to FIG. 4) of a fuel filler gun is introduced to the fuel filler port 1, and return the sub flap 2b and the main flap 5a mentioned later to a closed position so as to automatically close the fuel filler port 1 when the introduced fuel filler nozzle N is extracted. As a result, the fuel filler port device mentioned above does not require a cap of the thread type fuel filler port 1.

The fuel filler port device mentioned above is adapted to be attached to an upper end portion of a filler pipe (a fuel injection pipe) which is not illustrated.

In the illustrated example, the fuel filler port device mentioned above is constructed by a cover body 2 and a tubular main body portion 3.

The tubular main body portion 3 (a part of a main body 4) includes a seal member 5 and a guide member 6. The seal member 5 is fitted into the main body 4, and the guide member 6 is adapted to be fitted into the seal member 5. The cover body 2 is adapted to be attached to the tubular main body portion 3 while accommodating a tube upper end 3a of the tubular main body portion 3 in an inner side thereof.

Figure 1:
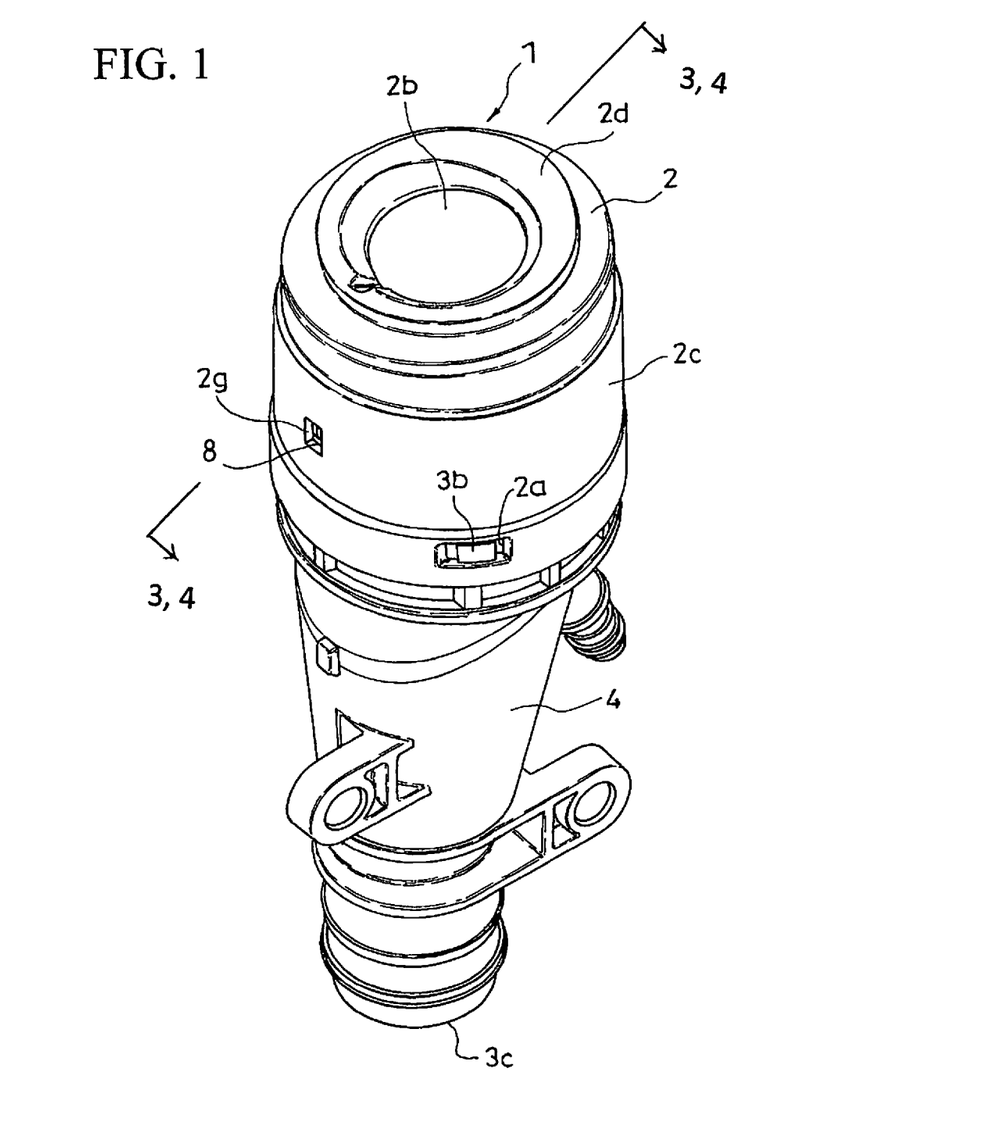
FIG. 1 is a perspective view of a fuel filler port device (a first example) according to an embodiment of the invention.
Figure 2:
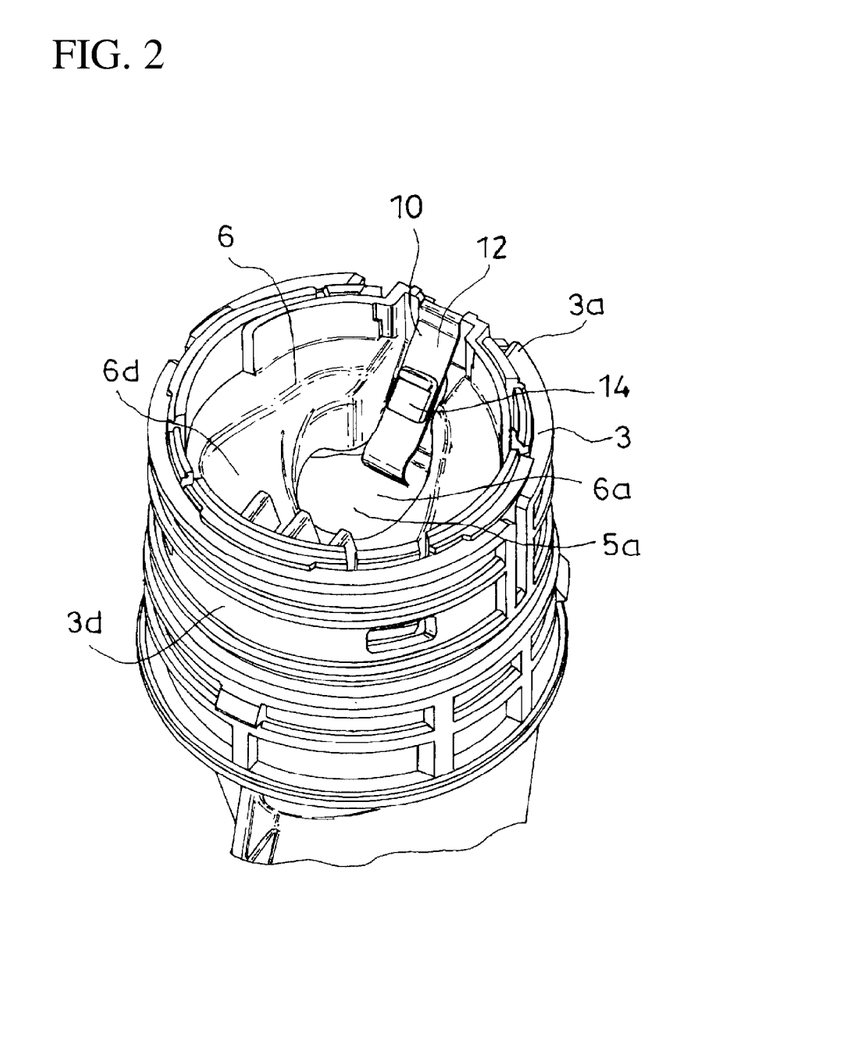
FIG. 2 is a perspective view showing a state in which a cover body forming the first example is detached from a tubular main body portion.

In the illustrated example, the cover body 2 attached to the tubular main body portion 3 is adapted to engage an engagement convex portion 3b formed in an outer side of the tubular main body portion 3 with a window hole shown by reference symbol 2a in FIG. 1.

More specifically, in the embodiment, a guide member 6 for the fuel filler nozzle N is provided away from the sub flap 2b provided in the cover body 2 and mentioned later, and a seal member 5 having the main flap 5a which is opened and closed by the fuel filler nozzle N is provided in a far side of the guide member 6.

(Tubular Main Body Portion 3)

The tubular main body portion 3 is substantially formed into a cylindrical shape, and has openings at both the tube upper end 3a and the tube lower end 3c. In the illustrated example, the tubular main body portion 3 is adapted to be attached to a filler pipe by fitting the tube lower end 3c side thereof into the filler pipe.

(Seal Member 5)

The seal member 5 is provided with a cylindrical main body 5c and the main flap 5a. The cylindrical main body 5c is open in both of its upper end and its lower end, and is substantially formed into a cylindrical shape. Between the upper end and the lower end, an internal space of the cylindrical main body 5c is separated into upper and lower sections by a partition wall 5d. An outer diameter of the cylindrical main body 5c is adapted to be substantially equal to an inner diameter of the main body.

Figure 3:
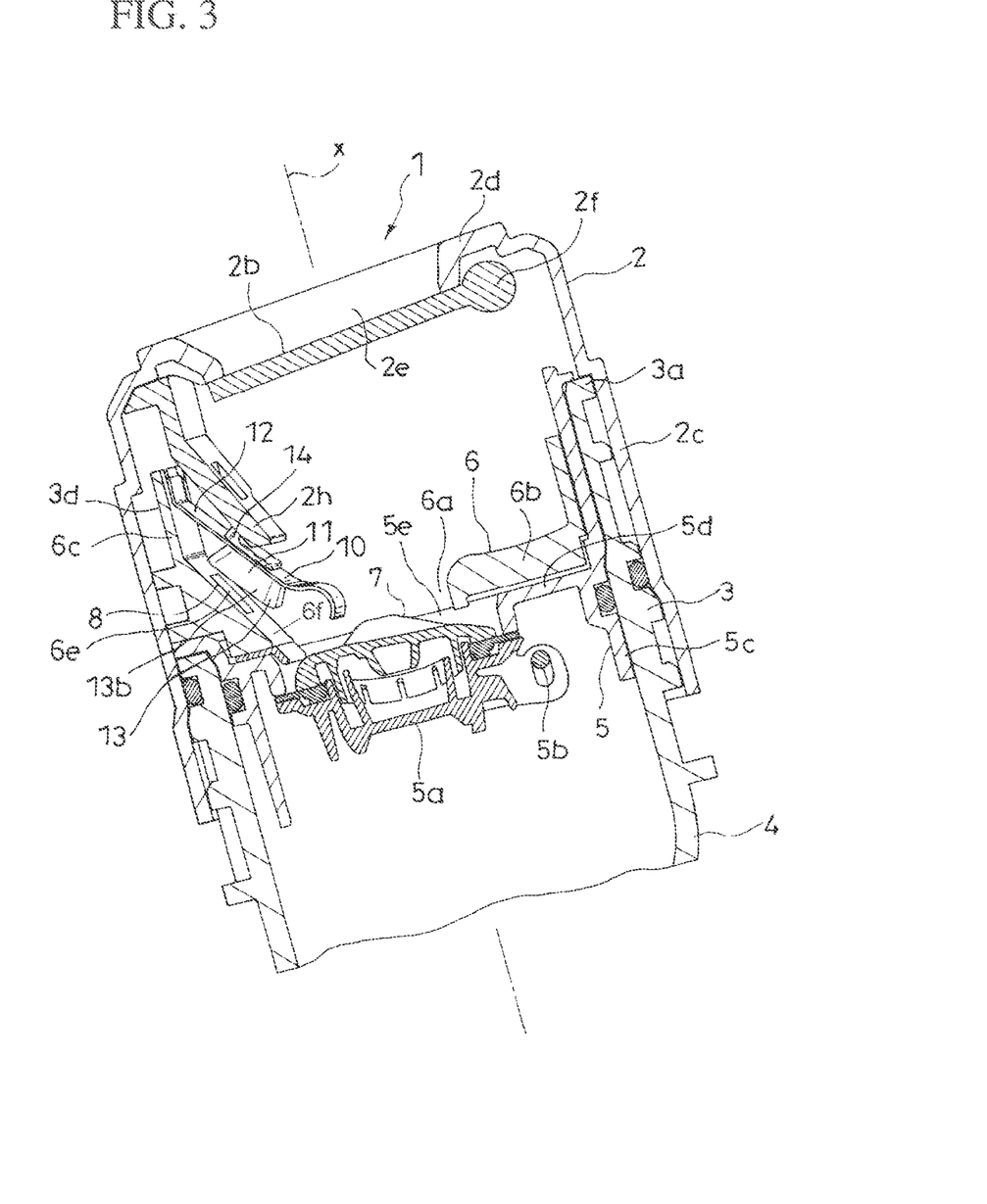
FIG. 3 is a cross sectional view taken along a line 3, 4 of the first example shown in FIG. 1.

A circular passage port 5e allowing the fuel filler nozzle N to pass is formed in the partition wall 5d. In FIG. 3, the main flap 5a is combined with the cylindrical main body so as to be rotatable around a rotation axis denoted by reference symbol 5b. The main flap 5a closes the passage port 5e by coming into pressure contact with the partition wall 5d from a lower side on the basis of biasing of a biasing means (illustration thereof will be omitted) at a closed position, thereby maintaining the closed state of the fuel filler port 1 until the fuel filler nozzle N is introduced.

(Cover Body 2)

The cover body 2 is provided with a cylindrical main body 2c and the sub flap 2b. The cylindrical main body 2c is open in its lower end, is provided in its upper end with an inner collar 2d which is formed into a cylindrical shape, and is adapted to form a passage port of the fuel filler nozzle N by throttling the upper end opening by the inner collar 2d. Hereinafter, the passage port mentioned above of the cover body 2 is called as a near side passage port 2e.

In the illustrated example, the cylindrical main body 2c is substantially formed into a cylindrical shape. An inner diameter of the cylindrical main body 2c is substantially equal to an outer diameter of the tubular main body portion 3 in the tube upper end 3a side. The cover body 2 and the tubular main body portion 3 are adapted to be combined in a state of covering the side portion 3d of the tubular main body portion 3 in the tube upper end 3a side from the outer side with the cylindrical main body 2c of the cover body 2, by fitting the tube upper end 3a of the tubular main body portion 3 into the cover body 2 from the lower end of the cylindrical main body 2c of the cover body 2.

The sub flap 2b is combined with the cylindrical main body so as to be rotatable around a rotation axis denoted by reference symbol 2f in FIG. 3. The sub flap 2b closes the near side passage port 2e by pressure contact with the inner collar 2d from the lower side at the closed portion on the basis of biasing of the biasing means which is not illustrated, thereby maintaining the closed state of the fuel filler port 1 until the fuel filler nozzle N is introduced.

(Guide Member 6)

The guide member 6 is adapted to be fitted between an upper end of the seal member 5 and the partition wall 5d from an upper end side of the seal member 5. A passage port 6a is formed in the guide member 6, the passage port 6a being positioned on the passage port 5e of the seal member 5 in the fitted state.

In the illustrated example shown in FIG. 3, a far side passage port 7 of the fuel filler nozzle N is formed in a far side of the sub flap 2b by the passage port 5e of the seal member 5, and the passage port 6a of the guide member 6.

The guide member 6 has a side portion 6c running through a lower portion 6b which is in contact with the seal member 5, is provided with the passage port 6a in the lower portion 6b, and is provided with a guide inclined surface 6d of the fuel filler nozzle N in an upper surface of the lower portion 6b.

On the basis of the introducing operation of the fuel filler nozzle N of the fuel filler gun into the fuel filler port 1, the sub flap 2b is first rotated to an open position, and the fuel filler nozzle N is allowed to move forward to the farther side of the near side passage port 2e. When the fuel filler nozzle N moves forward to the farther side than the near side passage port 2e, a leading end of the fuel filler nozzle N can be guided to the far side passage port 7 by the guide inclined surface 6d of the guide member 6. When the fuel filler nozzle N of the fuel filler gun is guided to the far side passage port 7, the main flap 5a is rotated to the open position, and the fuel filler nozzle N is allowed to move forward to the far side of the far side passage port 7.

(Drain Opening 8)

The fuel filler port device according to the embodiment shown in Fi. 3 is provided with a drain opening 8 in a near side of the main flap 5a which is rotated to the open position by the introduction of the fuel filler nozzle N and opens the fuel filler port 1.

More specifically, the embodiment is provided in the near side of the main flap 5*a* with the sub flap 2*b* which is rotated to the open position by the introduction of the fuel filler nozzle N and allows the introduction of the fuel filler nozzle N, and is provided in the side portion positioned between the main flap 5*a* and the sub flap 2*b* with drain opening 8.

In the illustrated example shown in FIG. 3, the drain opening 8 is constructed by aligning the through hole 6*e* which is formed in the guide member 6, a through hole 2*g* which is formed in a side portion of the cover body 2, and a through hole 9*a* which is formed in the seal body 9 lied between the guide member 6 and the cover body 2.

As shown in FIG. 3, in the fuel filler port device, a center axis x thereof is inclined relative to a vertical line such that the drain opening 8 is positioned at a lower side, and the drain opening 8 is formed in an inclined surface 6*f* inclined greater than the center axis x.

Therefore, in the near side of the main flap 5*a*, the liquid such as water and the fuel and drain subject such as dust entering into the fuel filler port device flow out of the drain opening 8 to an external side, or spill out, thereby making them enter into the far side of the main flap 5*a*, that is, into the fuel tank as little as possible.

(Closure Mechanism 10)

Further, the fuel filler port device according to the embodiment is provided with a closure mechanism 10 which closes the drain opening 8 in the fuel filling state.

The fuel filler gun may be additionally provided with a fuel evaporative gas recovery mechanism (illustration thereof will be omitted). The fuel evaporative gas recovery mechanism removes fuel evaporative gas within the fuel filler port device during fueling, preventing leaks to the exterior of the device to the maximum extent possible. However, in the case that the drain opening 8 is provided in the fuel filler port device, the fuel evaporative gas recovery mechanism sucks the outside air through the drain opening. As a result, there is a possibility that the control system erroneously recognizes that the fuel filler gun is not appropriately introduced into the fuel filler port device and stops filling the fuel. In the fuel filler port device according to the embodiment, the event mentioned above can be prevented as much as possible by the closure mechanism 10.

Figure 4:
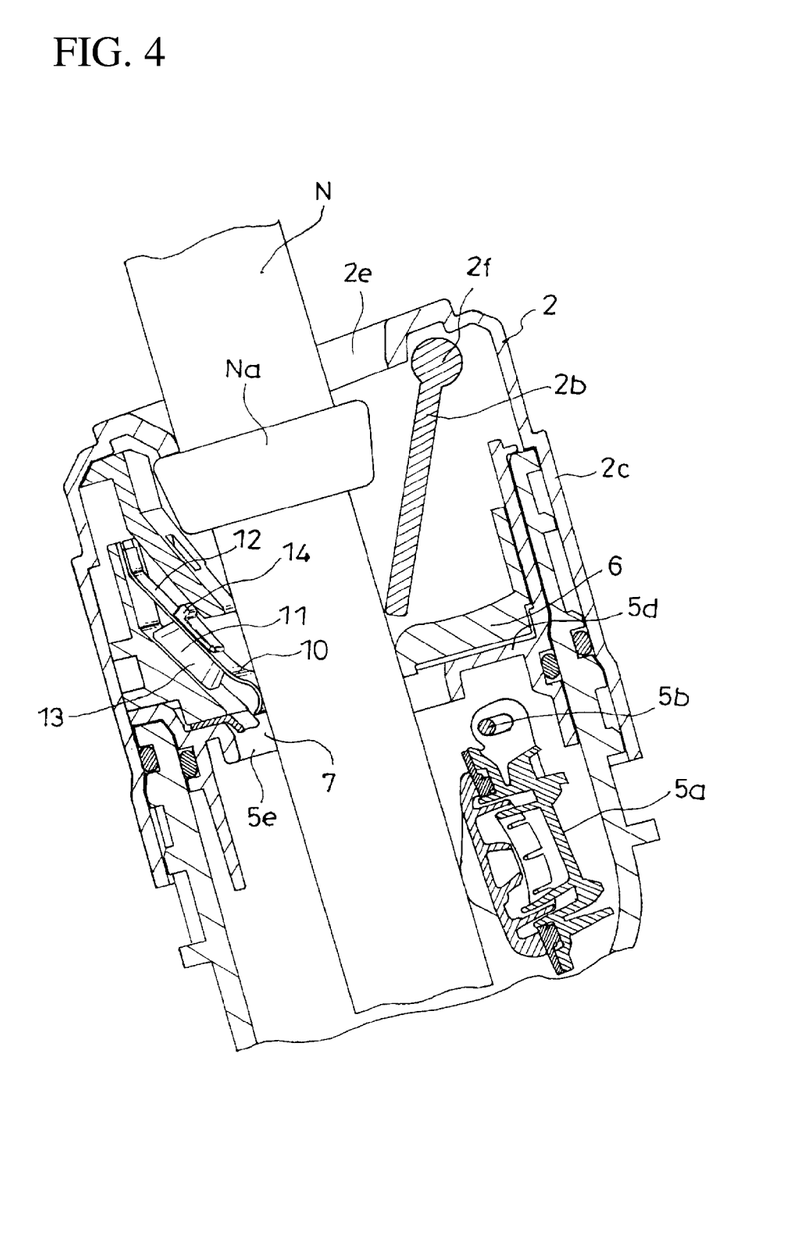
FIG. 4 is a cross sectional view taken along the line 3, 4 of the first example, and shows a state in which a fuel filler nozzle is introduced.
Figure 5:
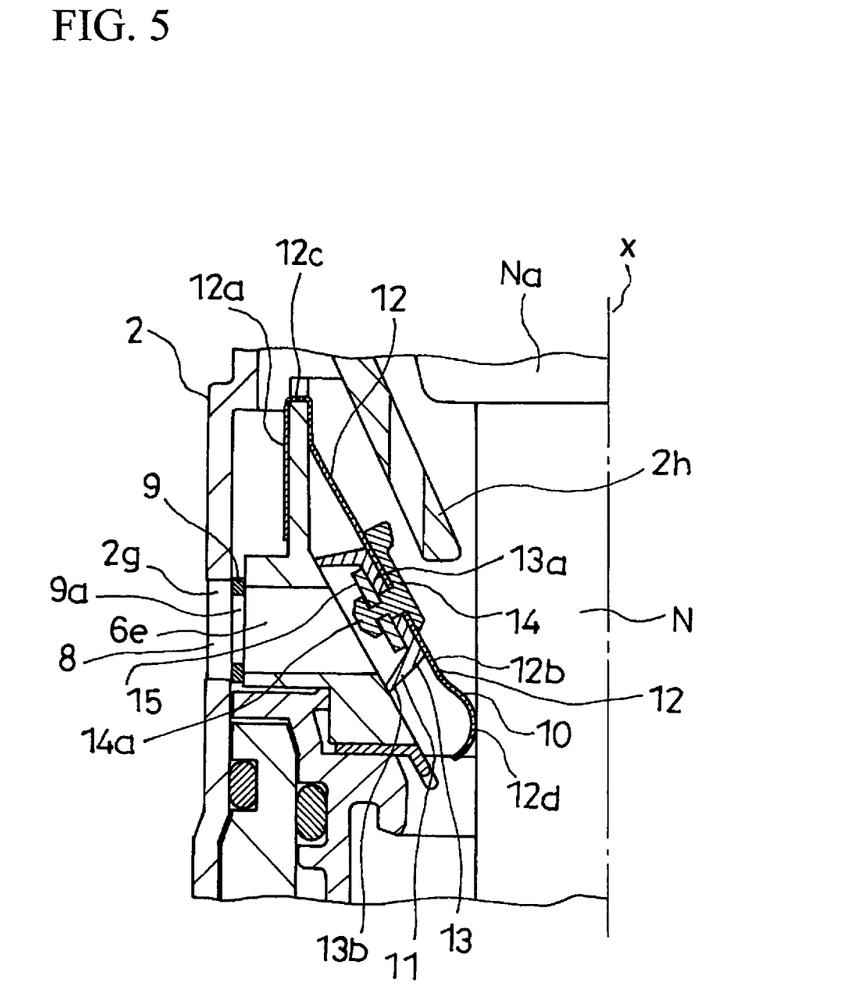
FIG. 5 is a cross sectional view of a substantial part of the first example.
Figure 6:
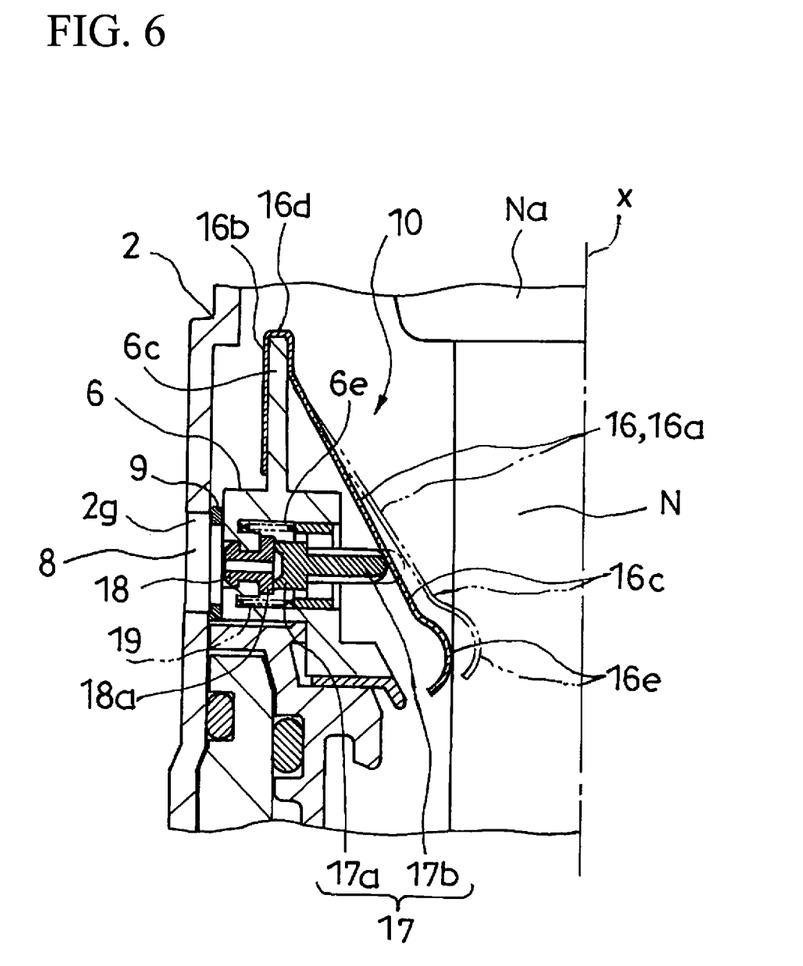
FIG. 6 is a cross sectional view of the fuel filler port device (a second example) according to the embodiment of the invention.
Figure 7:
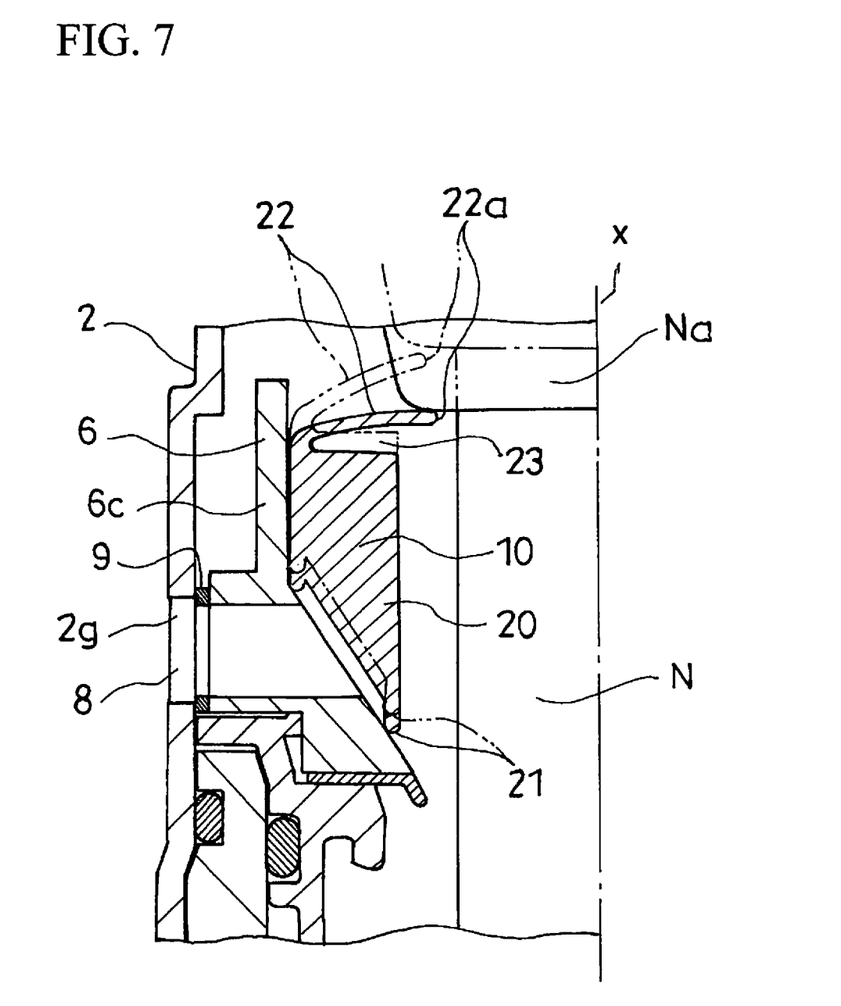
FIG. 7 is a cross sectional view of the fuel filler port device (a third example) according to the embodiment of the invention.
Figure 8:
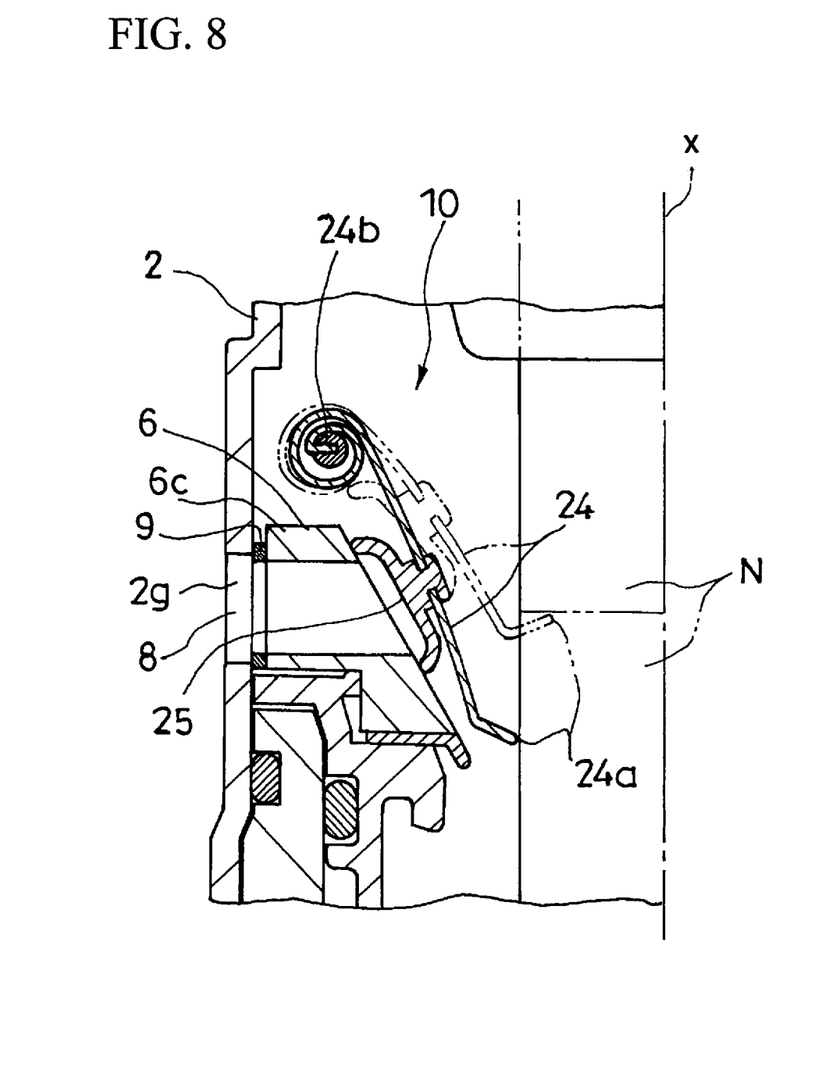
FIG. 8 is a cross sectional view of the fuel filler port device (a fourth example) according to the embodiment of the invention.

In a first example shown in FIGS. 1 to 5, a second example shown in FIG. 6, a third example shown in FIG. 7, and a fourth example shown in FIG. 8, the drain opening 8 is opened in a state in which the operation for introducing the fuel filler nozzle N of the fuel filler gun into the fuel filler port 1 is not carried out. In the meantime, when the operation for introducing the fuel filler nozzle N of the fuel filler gun into the fuel filler port 1 is carried out, the drain opening 8 is closed.

Figure 9:
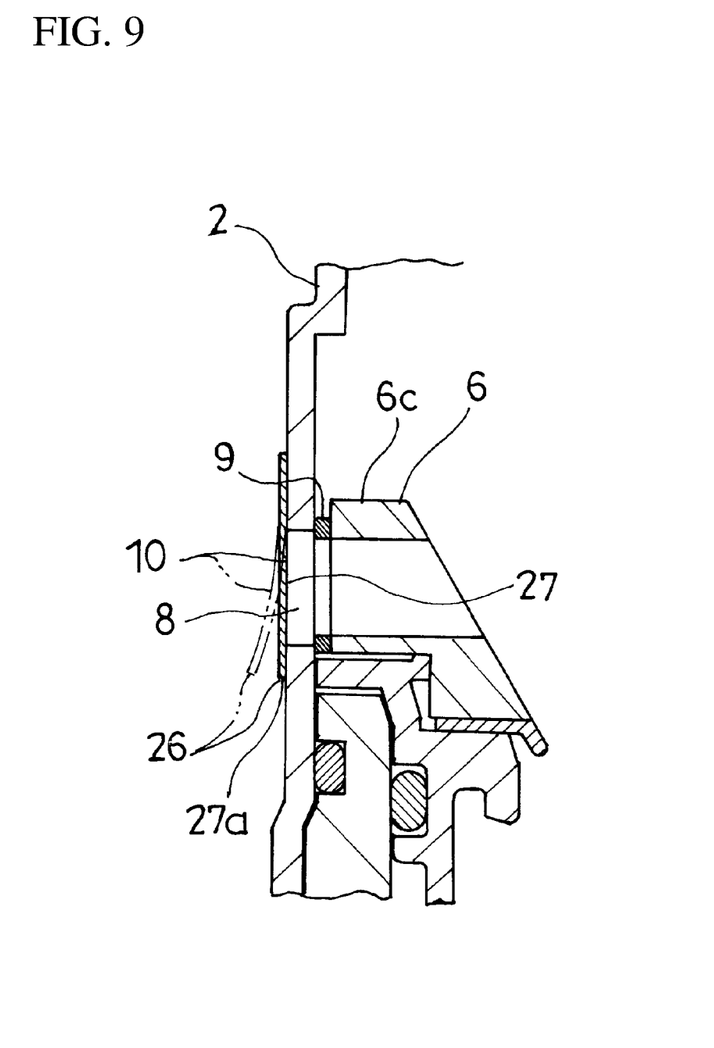
FIG. 9 is a cross sectional view of the fuel filler port device (a fifth example) according to the embodiment of the invention.

Further, in a fifth example shown in FIG. 9, the closed state of the drain opening 8 by the closure mechanism 10 is cancelled when the drain entering into the fuel filler port device reaches a fixed amount on the main flap 5*a*. In the meantime, in the case that the operation for introducing the fuel filler nozzle N of the fuel filler gun into the fuel filler port 1 is carried out, the closed state of the drain opening 8 by the closure mechanism 10 is not cancelled due to the fact that the fuel filler port device comes to a lower pressure than the external portion on the basis of the action of the fuel filler gun which is additionally provided with the fuel evaporative gas recovery mechanism.

First Example

In the first example, the closure mechanism 10 is formed as a movable valve element 11 which comes into contact with a part of the introduced fuel filler nozzle N and moves against biasing to the closure position of closing the drain opening 8.

In the illustrated example, the movable valve element 11 is constructed by a spring body 12, a sealing body 13 and a fastening body 14.

The spring body 12 is structured by bending a band body made of metal in a rectangular shape. The spring body 12 is provided with a first portion 12*a* which is positioned in an outer side of the guide member 6, a second portion 12*b* which is positioned in an inner side of the guide member 6, and a third portion 12*c* which connects an upper end of the first portion 12*a* and an upper end of the second portion 12*b*. The second portion 12*b* is formed in such a manner as to increase a distance in a lateral direction in relation to the first portion 12*a* step by step when it comes closer to a lower end of the second portion 12*b*. The spring body 12 is combined with the guide member 6 by attaching an upper portion side thereof to the side portion 6*c* of the guide member 6 in such a manner as to position the third portion 12*c* at an upper end of the side portion 6*c* of the guide member 6 (FIG. 5).

The sealing body 13 is attached to a side which is directed to an inner surface of the side portion 6*c* of the guide member 6 in the second portion 12*b* of the spring body 12.

In the illustrated example in FIG. 3, the fastening body 14 has a shaft portion 14*a* which passes through a hole formed in the second portion 12*b* of the spring body 12, and the sealing body 13 is attached to the spring body 12 by passing the shaft portion 14*a* to a hole which is formed in the base plate portion 13*a* of the sealing body 13, and fitting and attaching a washer 15 to a leading end of the shaft portion 14*a*.

The sealing body 13 is provided with a cylindrical protruding portion 13*b* which rises up from an edge portion of the base plate portion 13*a* in a side facing the inner surface of the side portion 6*c* of the guide member 6 in the base plate portion 13*a*.

In a state in which the fuel filler nozzle N is not introduced, the sealing body 13 is positioned by the spring body 12 at a position which does not bring the cylindrical protruding portion 13*b* into contact with the inner surface of the side portion 6*c* of the guide member 6 in the vicinity of the drain opening 8, and the drain opening 8 is opened (FIG. 3). Reference symbol 2*h* in FIG. 3 denotes a positioning portion of the spring body which is formed in a member constructing a part of the cover body 2, and is adapted to come into contact with a part of the fastening body 14.

When the fuel filler nozzle N is introduced, the fuel filler nozzle N comes into contact with a lower end side of the second portion 12*b* of the spring body 12, the second portion 12*b* of the spring body 12 is moved to an outer side on the basis of an elastic deformation, the cylindrical protruding portion 13*b* of the sealing body 13 comes into contact with the inner surface of the guide member 6, and the drain opening 8 is closed (FIGS. 4 and 5). In the illustrated example as shown in FIG. 3, the lower end side of the spring body 12 is curved in such a manner as to set the center axis x side of the fuel filler port device to an outer side of the curve, and is adapted to come into contact with the fuel filler nozzle N in the curved portion 12*d*.

Second Example

In the second example, the closure mechanism 10 is constructed by a movable body 16 which comes into contact with a part of the introduced fuel filler nozzle N and is moved against biasing from the reference position, and a movable valve element 17 which is pressed by the moved movable body 16 and moves against biasing to the closure position of closing the drain opening 8.

The movable body 16 is formed as a spring body 16a which is structured by bending a band body made of metal. The spring body 16a is provided with a first portion 16b which is positioned in an outer side of the guide member 6, a second portion 16c which is positioned in an inner side of the guide member 6, and a third portion 16d which connects an upper end of the first portion 16b and an upper end of the second portion 16c. The second portion 16c is formed such that as a distance from the first portion 16b is increased, a distance in the lateral direction from the guide member 6 is increased. The spring body 16a is combined with the guide member 6 by connecting an upper portion side thereof to the side portion 6c of the guide member 6 in such a manner as to position the third portion 16d at an upper end of the side portion 6c of the guide member 6. The second portion 16c is adapted to serve as the movable body 16.

The movable valve element 17 has a sealing portion 17a which is positioned within a through hole 6e of the guide member 6 forming a part of the drain opening 8, and a contact portion 17b which protrudes out toward an inner side of the guide member 6 from the through hole 6e.

A bush 18 is fitted and attached to a front side of the sealing portion 17a of the movable valve element 17. An inner portion of the bush 18 forms a passage which communicates inner and outer sides of the guide member 6. A flange 18a formed on a side directed to the inner side of the guide member 6 in the bush 18 is adapted to serve as a valve seat in relation to the contact portion 17b of the movable valve element 17. An element shown by reference numeral 19 in the drawing is a spring which biases the movable valve element 17 in a valve releasing direction.

In a state in which the fuel filler nozzle N is not introduced, the movable body 16 is at a reference position, the movable valve element 17 brings its contact portion 17b into contact with the movable body 16 at the reference position, and a sealing portion 17a is positioned at a valve release position which does not bring the sealing portion 17a into contact with the flange 18a serving as the valve seat (shown by a two-dot chain line in FIG. 6), and the drain opening 8 is opened.

When the fuel filler nozzle N is introduced, the fuel filler nozzle N comes into contact with a lower end side of the second portion 16c of the spring body 16a constructing the movable body 16, the second portion 16c of the spring body 16a is moved to an outer side on the basis of an elastic deformation, and presses the contact portion 17b of the movable valve element 17, the movable valve element 17 moves against biasing of the spring 19 to a position which makes the sealing portion 17a seat on the flange 18a serving as the valve seat, and the drain opening 8 is closed (FIG. 6). In the illustrated example in FIG. 6, the lower end side of the spring body 16a is curved so as to make the center axis x side of the fuel filler port device to the outer side of the curve, and is adapted to come into contact with the fuel filler nozzle N in the curved portion 16e.

In this second example, it is possible to securely move the movable valve element 17 to the position of closing the drain opening 8 when the movable body 16 moves at a predetermined amount from the reference position.

Third Example

In the third example, the closure mechanism 10 is formed as a movable valve element 20 which comes into contact with a part of the introduced fuel filler nozzle N and slides against biasing in a direction of introducing the fuel filler nozzle N so as to move to a closure position of closing the drain opening 8.

In this third example, the movable valve element 20 has a sealing portion 21 in its lower end, and is adapted to be positioned at a reference position which does not bring the sealing portion 21 into contact with an inner surface of the guide member 6 running through the drain opening 8 positioned just below the sealing portion 21, in a state in which the fuel filler nozzle N is not introduced, by a biasing means which is not illustrated (shown by a two-dot chain line in FIG. 7). In a state in which the movable valve element 20 is at the reference position, the drain opening 8 is opened.

When the fuel filler nozzle N is introduced, the fuel filler nozzle N comes into contact with the upper end side of the movable valve element 20, the movable valve element 20 is moved against the biasing of the biasing means in a direction of introducing the fuel filler nozzle N, and the drain opening 8 is closed by bringing the sealing portion 21 into close contact with the inner surface of the guide member 6 (FIG. 7).

In this third example, a blank space 23 is formed in an upper end side of the movable valve element 20, the blank space 23 being open in the center axis x side of the fuel filler port device which forms an elastic piece 22 in the upper end side. On the basis of the blank space 23, the elastic piece 22 is adapted to set the center axis x side to a free end 22a. In the illustrated example, a flange Na formed on an outer surface of the fuel filler nozzle N comes into contact with the free end 22a of the elastic piece 22 at a predetermined introduction position and is adapted to move the movable valve element 20 to the position of closing the drain opening 8 while elastically deforming the elastic piece 22.

Fourth Example

In the fourth example, the closure mechanism 10 is constructed by a constant force spring 24 which comes into contact with a part of the introduced fuel filler nozzle N and is pulled out against the biasing in the direction of introducing the fuel filler nozzle N, and a sealing body 25 which is provided in the constant force spring 24 and closes the drain opening 8 at the predetermined pull-out position.

In this fourth example, the constant force spring 24 is provided with the sealing body 25 in a side facing the inner surface of the guide member 6 closer to the pull-out end portion 24a side of the winding portion. Further, the winding portion of the constant force spring 24 is fixed at its end portion 24b opposite to the pull-out end portion 24a side to the tubular main body portion 3 in an upstream side of the drain opening 8, and is wound in such a manner as to have the opposite end portion 24b as the center of winding.

In a state in which the constant force spring 24 is completely taken up, the sealing body 25 is away from the inner surface of the guide member 6, and is positioned at a position of opening the drain opening 8 (shown by a two-dot chain line in FIG. 8).

When the fuel filler nozzle N is introduced, the fuel filler nozzle N comes into contact with the pull-out end portion 24a of the constant force spring 24, and the constant force spring 24 is pulled out to a predetermined position. When the constant force spring 24 is pulled out to the predetermined position, the sealing body 25 comes into close contact with the inner surface of the guide member 6 and the drain opening 8 is closed (FIG. 8).

Fifth Example

In the fifth example, the closure mechanism 10 is formed as a movable valve element 26 which is biased to the closure position of closing the drain opening 8 and moves against biasing on the basis of the weight of the drain subject due to staying of the drain subject in the near side of the main flap 5a so as to open the drain opening 8.

In the illustrated example, the movable valve element 26 is constructed by an elastically deformable plate body 27 which is fastened at its upper end to an outer surface of the side portion of the cover body 2, sets its lower end to a free end 27a, and comes into close contact with an outer surface in the side portion of the cover body 2 as a whole in a state in which the drain subject does not stay at a predetermined amount so as to close the drain opening 8.

As a matter of course, the present invention is not limited to the embodiment described above, but includes all the embodiments which can achieve the object of the present invention.

The present invention claims priority of Japanese Patent Application No. 2017-125226 filed Jun. 27, 2017, the disclosure of which is incorporated as a reference.

REFERENCE SIGNS LIST

N . . . fuel filler nozzle
1 . . . fuel filler port
5a . . . main flap
8 . . . drain opening
10 . . . closure mechanism

What is claimed is:

1. A fuel filler port device, comprising:
a fuel filler port,
a main flap which is disposed in the fuel filler port and is configured to be rotated to an open position by introducing a fuel filler nozzle to thereby open the fuel filler port,
a drain opening disposed in the fuel filler port at an outer side of the main flap,
a closure mechanism which closes the drain opening in a fuel filling state, and
a sub flap provided in the fuel filler port on a side close to a passage port of the fuel filler port, the sub flap being configured to be rotated to an open position by introduction of the fuel filler nozzle,
wherein the drain opening is provided in a side portion between the main flap and the sub flap,
the closure mechanism is a movable valve element movable to a closure position closing the drain opening, the movable valve element being configured to contact a part of the fuel filler nozzle introduced into the fuel filler port and moving against biasing to the closure position,
the movable valve element includes a spring body made of metal and fixed at one end relative to the fuel filler port, the spring body having a rectangular shape and including a curved portion formed at a side opposite to the one end and curved in a semi-circular shape to orient at first toward the passage port and change to a direction opposite to the passage port.

2. The fuel filler port device according to claim 1, wherein the movable valve element further comprises a sealing element attached to the spring body, which is configured to be moved by the fuel filler nozzle and moves to close the drain opening.

3. The fuel filler port device according to claim 2, further comprising a guide member disposed in the fuel filler port and adapted to guide the fuel filler nozzle, the guide member being disposed between the main flap and the sub flap and having an inclined surface with an opening communicating with the drain opening through a through hole, and a side portion located above the inclined surface, the one end of the spring body being attached to the side portion.

4. The fuel filler port device according to claim 3, wherein the movable valve element further includes a fastening body attached to the spring body to attach the sealing element to the spring body for closing the opening when the spring body is pushed by the fuel filler nozzle.

5. The fuel filler port device according to claim 3, further comprising a cover body disposed above the guide member and having a positioning portion configured to contact a part of the spring body when the fuel filler nozzle is not introduced.

6. The fuel filler port device according to claim 3, wherein the fuel filler port comprises a cover body to which the sub flap is attached, a main body portion attached to the cover body and having the guide member therein, and a seal member under the guide member, the seal member having the main flap.

* * * * *